3,173,930
2-KETO-10-SUBSTITUTED ESTRANES
Alexander D. Cross, Mexico City, Mexico, assignor to Syntex Corporation, Panama, Panama, a corporation of Panama
No Drawing. Filed Dec. 23, 1963, Ser. No. 332,964
Claims priority, application Mexico, July 31, 1963, 73,252
20 Claims. (Cl. 260—397.1)

The present invention relates to novel cyclopentanophenanthrene derivatives and a process for the production thereof.

More particularly the present invention relates to novel $10\alpha$ and $10\beta$-substituted $5\alpha$-estran-$17\beta$-ol-2-one derivatives wherein the substituent at C–10 is a cyano, dicarbethoxymethyl, ethinyl, acetonyl or $\beta$-cyanoethyl group. It also relates to a novel process for making $10\alpha$ and $10\beta$-androstan-$17\beta$-ol-2-one derivatives, from the corresponding $\Delta^{1(10)}$-2-keto compounds.

The novel compounds of the present invention are represented by the following formulas:

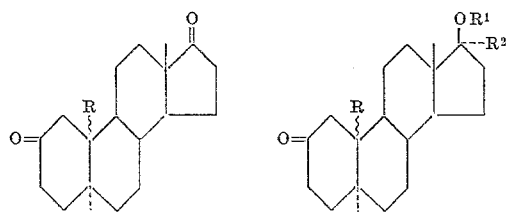

In the above formulas R represents a cyano group, a dicarbethoxymethyl grouping, an ethinyl group, an acetonyl group or a $\beta$-cyanoethyl group all with $\alpha$ or $\beta$ configurations; $R^1$ represents hydrogen or a hydrocarbon carboxylic acyl group of less than 12 carbon atoms and $R^2$ represents hydrogen, lower alkyl, lower alkenyl or lower alkinyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The compounds represented by the above formulas are anabolic agents with a favorable androgenic-anabolic ratio. Further, they are anti-estrogenic and anti-gonadotrophic compounds lower the blood and adrenal cholesterol levels.

The compounds of the above formulas wherein $R^2$ is lower alkenyl or lower alkinyl possess, in addition, progestational activity, also when administered orally, and are useful in fertility control.

The novel compounds of the present invention are prepared by the process illustrated as follows:

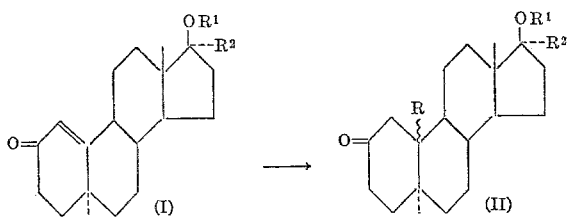

In the above formulas R, $R^1$ and $R^2$ have the same meaning as previously set forth.

In accordance with the latter equation, the starting compound (I) which is a $\Delta^{1(10)}$-estren-$17\beta$-ol-2-one derivative (obtained according to my copending U.S. patent application Serial No. 332,961, filed of even date, by conventional ketalization of $\Delta^{1(10)}$-$5\alpha$-estren-$17\beta$-ol-2-one, oxidation of the obtained 2-cycloethylenedioxy-$\Delta^{5(10)}$-estren-$17\beta$-ol to the corresponding $17\beta$-ketone preferably with chromium anhydride, treatment of the 17-ketone with a lower alkyl, alkenyl or alkinyl magnesium halide to give the corresponding $17\alpha$-substituted 2-cycloethylenedioxy-$\Delta^{5(10)}$-estren-$17\beta$-ol and conventional hydrolyzation of the latter to the corresponding $\Delta^{1(10)}$-2-ketone) and may be substituted at C–17$\alpha$, by a lower alkyl, alkenyl, or alkinyl group, is treated with an alkali metal cyanide such as potassium cyanide, in a polar organic solvent, such as lower hydrocarbon mono or poly alcohols for example glycol or ethanol and preferably at reflux temperature, thus affording the corresponding $10\alpha$-cyano-$5\alpha$-estran-$17\beta$-ol-2-one together with the respective $10\beta$-cyanoisomer (II: R=cyano).

Upon treatment of the starting $\Delta^{1(10)}$-2-keto steroid (I) with diethyl malonate in an organic solvent inert to said reagent, such as a lower alkanol, e.g. ethanol, in the presence of a suitable basic catalyst, as for example a sodium lower alkoxide such as the ethoxide, there are produced the corresponding $10\alpha$-dicarbethoxymethyl-$5\alpha$-estran-$17\beta$-ol-2-one compound and the respective $10\beta$-isomer thereof (II: R=dicarbethoxymethyl).

When starting compound (I) is treated with an alkali metal acetylide preferably lithium acetylide in a solvent inert to the organo-metallic reagent, such as tetrahydrofuran, there are obtained the corresponding $10\alpha$ and $10\beta$-ethinyl-$5\alpha$-estran-$17\beta$-ol-2-one derivatives (II: R=ethinyl), with acyloxy groups that could have been present in the starting compounds hydrolyzed to the corresponding hydroxy groups.

Proceeding in accordance with the latter scheme the starting compound (I) is treated with dimethyl ketone in the presence of a basic catalyst, such as an amine e.g. piperidine, to give the corresponding $10\beta$ and $10\alpha$-acetonyl-$5\alpha$-estran-$17\beta$-ol-2-one derivatives (II: R=acetonyl).

In order to obtain the $10\beta$-cyanoethyl compounds the starting compound (I) is treated with acrylonitrile in the presence of a basic catalyst, preferably benzyltrimethyl ammonium hydroxide (Triton B) in a suitable inert solvent such as dioxane, thus producing the corresponding $10\alpha$-($\beta$-cyanoethyl)-$5\alpha$-estran-$17\beta$-ol-2-one together with the corresponding $10\beta$-isomer (II: R=$\beta$-cyanoethyl).

In all the above reactions, separation of the $10\alpha$-compounds from the corresponding $10\beta$-isomers may be effected by conventional procedures such as column chromatography or fractional crystallization.

The process of the present invention for the novel production of 10-methyl-2-keto-estranes, which are useful intermediates in the production of 2-methylene-androstanes which, in turn, are valuable anabolic agents (U.S. patent of Bowers et al., No. 3,082,223) is represented by the following equation wherein only appear rings A and B:

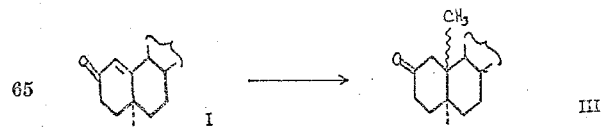

Proceeding in accordance with the latter scheme, the starting compound which is a $\Delta^{1(10)}$-estren-$17\beta$-ol-2-one derivative and may be substituted by lower alkyl, alkenyl, or alkinyl groups in a number of positions in the molecule, especially at C-17α, may have present hydroxy or acyloxy groups in positions 4, 6, 7, 11 or 12 and especially C-17β, is treated with a methyl magnesium halide, preferably methyl magnesium bromide in a suitable solvent inert to Grignard reagent, such as tetrahydrofuran and in the presence of cuprous chloride thus giving the corresponding 10α - methyl - 5α - estran - 17β - ol - 2 - one, together with the corresponding 10β-methyl isomer (III) which are separated from each other by conventional procedures such as column chromatography or fractional crystallization.

The novel 17-keto-compounds of the present invention are prepared by the process exemplified as follows:

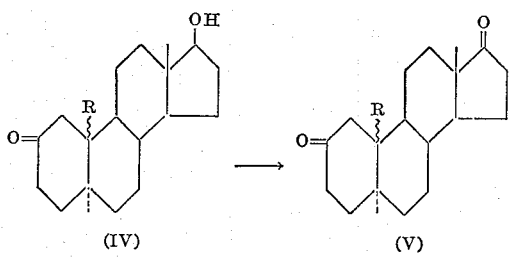

In the above formulas R has the same meaning as set forth hereinbefore.

In accordance with the latter scheme the starting compound (IV) which is a 10α or 10β-substituted 17α-unsubstituted-5α-estran-17β-ol-2-one, obtained by the procedures described hereinbefore is treated with a conventional oxidizing agent such as chromium trioxide, preferably in an 8N sulfuric acid acetone solution, at a temperature of around 0–5° C. to produce the corresponding 10α or 10β-substituted-5α-estran-2,17-dione (V).

The secondary free hydroxyl group of the compounds of the present invention, is conventionally acylated in pyridine with a suitable acylating agent, such as an anhydride derived from a hydrocarbon carboxylic acid of the type defined above to give the corresponding acylate.

The free tertiary hydroxyl group of the compound of the present invention, e.g. the 17β-hydroxyl of the 17α-substituted compound, is conventionally esterified in the presence of p-toluene sulfonic acid with an acylating agent of the type just described, to give the corresponding esters.

The following specific examples serve to illustrate the present invention but are not intended to limit it.

*Example I*

To a mixture of 1 g. of the acetate of $\Delta^{1(10)}$-estren-17β-ol-2-one (prepared according to my aforesaid patent application) 1 g. of cuprous chloride and 30 cc. of anhydrous tetrahydrofuran was added, while stirring and cooling, 30 cc. of tetrahydrofuran, containing 3 mol. equivalent of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by successive crystallization from methylene chloride-hexane to produce 10α-methyl-5α-estran-17β-ol-2-one and the corresponding 10β-isomeric derivatives.

The starting compounds listed under I (which were obtained according to my aforesaid patent application) were treated by the same procedure to give the corresponding 10α-substituted products set forth under II, together with each one of the corresponding 10β-isomers which could be isolated from the mixture by the use of fractional crystallization or conventional chromatography methods:

| I | II |
|---|---|
| $\Delta^{1(10)}$-5α-estren-17β-ol-2-one | 10α-methyl-5α-estran-17β-ol-2-one. |
| Propionate of $\Delta^{1(10)}$-5α-estren-17β-ol-2-one. | 10α-methyl-5α-estran-17β-ol-2-one. |
| Caproate of $\Delta^{1(10)}$-5α-estren-17β-ol-2-one. | 10α-methyl-5α-estran-17β-ol-2-one. |
| 17α-methyl-$\Delta^{1(10)}$-5α-estren-17β-ol-2-one. | 10α,17α-dimethyl-5α-estran-17β-ol-2-one. |
| 17α-vinyl-$\Delta^{1(10)}$-5α-estren-17β-ol-2-one. | 10α-methyl-17α-vinyl-5α-estran-17β-ol-2-one. |
| 17α-ethinyl-$\Delta^{1(10)}$-5α-estren-17β-ol-2-one. | 10α-methyl-17α-ethinyl-5α-estran-17β-ol-2-one. |
| Acetate of 17α-methyl-$\Delta^{1(10)}$-5α-estren-17β-ol-2-one. | 10α,17α-dimethyl-5α-estran-17β-ol-2-one. |
| Propionate of 17α-vinyl-$\Delta^{1(10)}$-5α-estren-17β-ol-2-one. | 10α-methyl-17α-vinyl-5α-estran-17β-ol-2-one. |
| Caproate of 17α-ethinyl-$\Delta^{1(10)}$-5α-estren-17β-ol-2-one. | 10α-methyl-17α-ethinyl-5α-estran-17β-ol-2-one. |

*Example II*

5 g. of the acetate of $\Delta^{1(10)}$-5α-estren-17β-ol-2-one were mixed with 8 g. of potassium cyanide in 200 cc. of ethanol and then the obtained mixture was heated under reflux during 10 hours. It was cooled, diluted with water and the product of the reaction extracted with ethyl acetate. The organic extract was washed with water, dried over anhydrous sodium sulfate and the solvent distilled off.

The obtained residue was chromatographed on a column having 250 g. of neutral alumina and from the fractions eluted with benzene ether (1:1) there was obtained the acetate of 10α-cyano-5α-estran-17β-ol-2-one; from the fractions eluted with a benzene-ether (1:2) was isolated the corresponding 10β-isomer which was found in a smaller proportion than the 10α-isomer.

Following exactly the above technique, there were treated the starting compounds listed under I, to give the corresponding 10α-substituted products set forth under II, each together with the respective 10β-isomer which was separated in each case using the procedures mentioned in Example I:

| I | II |
|---|---|
| $\Delta^{1(10)}$-5α-estren-17β-ol-2-one | 10α-cyano-5α-estran-17β-ol-2-one. |
| Propionate of $\Delta^{1(10)}$-5α-estren-17β-ol-2-one. | Propionate of 10α-cyano-5α-estran-17β-ol-2-one. |
| Caproate of $\Delta^{1(10)}$-5α-estren-17β-ol-2-one. | Caproate of 10α-cyano-5α-estran-17β-ol-2-one. |
| 17α-methyl-$\Delta^{1(10)}$-5α-estren-17β-ol-2-one. | 17α-methyl-10α-cyano-5α-estran-17β-ol-2-one. |
| 17α-vinyl-$\Delta^{1(10)}$-5α-estren-17β-ol-2-one. | 17α-vinyl-10α-cyano-5α-estran-17β-ol-2-one. |
| 17α-ethinyl-$\Delta^{1(10)}$-5α-estren-17β-ol-2-one. | 17α-ethinyl-10α-cyano-5α-estran-17β-ol-2-one. |
| Acetate of 17α-methyl-$\Delta^{1(10)}$-5α-estren-17β-ol-2-one. | Acetate of 17α-methyl-10α-cyano-5α-estran-17β-ol-2-one. |
| Propionate of 17α-vinyl-$\Delta^{1(10)}$-5α-estren-17β-ol-2-one. | Propionate of 17α-vinyl-10α-cyano-5α-estran-17β-ol-2-one. |
| Caproate of 17α-ethinyl-$\Delta^{1(10)}$-5α-estren-17β-ol-2-one. | Caproate of 17α-ethinyl-10α-cyano-5α-estran-17β-ol-2-one. |

*Example III*

To a solution of sodium ethoxide in ethanol (prepared from 500 mg. of recently cut sodium in 15 cc. of absolute ethanol) were added 7 cc. of diethyl malonate, freshly distilled, together with 15 g. of the acetate of $\Delta^{1(10)}$-5α-estren-17β-ol-2-one dissolved in 200 cc. of absolute ethanol. The obtained mixture was heated under reflux in a nitrogen atmosphere during 2 hours and was clarified after 15 minutes of having initiated the heat. The solution thus obtained was cooled and poured into a mixture of 380 cc. of water and 20 cc. of acetic acid. The organic product was extracted with ethyl-acetate and the aqueous fractions was extracted two times more with the same solvent (100 cc. each time). The organic extracts were combined, washed with a diluted solution of sodium carbonate in water and then washed to neutral with water. The organic layer was dried over anhydrous sodium sulfate and evaporated to dryness under vacuum. The residue was chromatographed on a column prepared with 600 g. of silica-gel and the solid fractions eluted with benzene ether (3–1) produced the acetate of 10α-(dicarbethoxymethyl)-5α-estran-17β-ol-2-one. Further elution with ether alone gave the corresponding 10β-isomer. The two isomers were recrystallized separately from acetone-hexane to produce the corresponding pure compound.

The starting compound mentioned in Example I was treated in an identical manner, to produce the corresponding 10α-substituted derivatives hereinafter set forth, together with the respective 10β-steroid isomers.
Produced compounds:

10α-dicarbethoxymethyl-5α-estran-17β-ol-2-one.
Propionate of 10α-dicarbethoxymethyl-5α-estran-17β-ol-2-one.
Caproate of 10α-dicarbethoxymethyl-5α-estran-17β-ol-2-one.
17α-methyl-10α-dicarbethoxymethyl-5α-estran-17β-ol-2-one.
17α-vinyl-10α-dicarbethoxymethyl-5α-estran-17β-ol-2-one.
17α-ethinyl-10α-dicarbethoxymethyl-5α-estran-17β-ol-2-one.
Acetate of 17α-methyl-10α-dicarbethoxymethyl-5α-estran-17β-ol-2-one.
Propionate of 17α-vinyl-10α-dicarbethoxymethyl-5α-estran-17β-ol-2-one.
Caproate of 17α-ethinyl-10α-dicarbethoxymethyl-5α-estran-17β-ol-2-one.

*Example IV*

There was passed a slow current of purified acetylene through a suspension of 1 g. of lithium aluminum hydride in 50 cc. of anhydrous tetrahydrofuran during 3 hours at room temperature and with constant stirring, then there was added dropwise a solution of 1 g. of the acetate of Δ¹⁽¹⁰⁾-5α-estren-17β-ol-2-one, in 50 cc. of anhydrous tetrahydrofuran and the reacting mixture was kept during 24 hours under the same conditions, then it was poured into water. The resulting mixture was acidified with a 2 N hydrochloric acid solution and the organic product extracted with ethyl acetate. The extract was washed with water until neutral, dried over anhydrous sodium sulfate and evaporated to dryness. By chromatography of the residue on 150 g. of neutral alumina there was produced 10α-ethinyl-5α-estran-17β-ol-2-one and the 10β-ethinyl-isomeric derivative thereof. Upon applying this procedure to the starting compounds listed under I, there were obtained the corresponding 10α-ethinyl products indicated under II together with the respective isomeric 10β-substituted derivatives which were separated from the original mixture of the two isomers by the purification technique set forth in Example I:

| I | II |
|---|---|
| Δ¹⁽¹⁰⁾-5α-estren-17β-ol-2-one | 10α-ethinyl-5α-estran-17β-ol-2-one. |
| Propionate of Δ¹⁽¹⁰⁾-5α-estren-17β-ol-2-one. | 10α-ethinyl-5α-estran-17β-ol-2-one. |
| Caproate of Δ¹⁽¹⁰⁾-5α-estren-17β-ol-2-one. | 10α-ethinyl-5α-estran-17β-ol-2-one. |
| 17α-methyl-Δ¹⁽¹⁰⁾-5α-estren-17β-ol-2-one. | 10α-ethinyl-17α-methyl-5α-estran-17β-ol-2-one. |
| 17α-vinyl-Δ¹⁽¹⁰⁾-5α-estren-17β-ol-2-one. | 10α-ethinyl-17α-vinyl-5α-estran-17β-ol-2-one. |
| 17α-ethinyl-Δ¹⁽¹⁰⁾-5α-estren-17β-ol-2-one. | 10α, 17α-diethinyl-5α-estran-17β-ol-2-one. |
| Acetate of 17α-methyl-Δ¹⁽¹⁰⁾-5α-estren-17β-ol-2-one. | 10α-ethinyl-17α-methyl-5α-estran-17β-ol-2-one. |
| Propionate of 17α-vinyl-Δ¹⁽¹⁰⁾-5α-estren-17β-ol-2-one. | 10α-ethinyl-17α-vinyl-5α-estran-17β-ol-2-one. |
| Caproate of 17α-ethinyl-Δ¹⁽¹⁰⁾-5α-estren-17β-ol-2-one. | 10α, 17α-diethinyl-5α-estran-17β-ol-2-one. |

*Example V*

A solution of 5 g. of the acetate of Δ¹⁽¹⁰⁾-5α-estren-17β-ol-2-one in 15 cc. of freshly distilled pyridine and 250 cc. anhydrous acetone, was heated under reflux during 16 hours. The excess of acetone together with the piperidine were eliminated by distillation in vacuo. The obtained organic residue was chromatographed on a column of 250 g. of silica in order to obtain separately the acetate of 10α-acetonyl-5α-estran-17β-ol-2-one (eluted with benzene-ether mixture 1:1) and the corresponding 10β-isomeric derivative (eluted with benzene-ether mixture 1:3). Crystallization of these steroid derivatives from acetone-ether separately, gave the products in pure form.

Following the same technique, there were treated the starting compound mentioned in Example I, to produce the corresponding 10α-isomeric products hereafter described, together with the respective 10β-acetonyl substituted derivatives:

10α-acetonyl-5α-estran-17β-ol-2-one.
Propionate of 10α-acetonyl-5α-estran-17β-ol-2-one.
Caproate of 10α-acetonyl-5α-estran-17β-ol-2-one.
17α-methyl-10α-acetonyl-5α-estran-17β-ol-2-one.
17α-vinyl-10α-acetonyl-5α-estran-17β-ol-2-one.
17α-ethinyl-10α-acetonyl-5α-estran-17β-ol-2-one.
Acetate of 17α-methyl-10α-acetonyl-5α-estran-17β-ol-2-one.
Propionate of 17α-vinyl-10α-acetonyl-5α-estran-17β-ol-2-one.
Caproate of 17α-ethinyl-10α-acetonyl-5α-estran-17β-ol-2-one.

*Example VI*

20 g. of the acetate of Δ¹⁽¹⁰⁾-5α-estren-17β-ol-2-one were dissolved in 100 cc. of dioxane together with 3 cc. of a 30% aqueous solution of benzyl tri-methyl ammonium hydroxide (Triton B) and then there were added 8 cc. of acrylonitrile dissolved in 20 cc. of dioxane while maintaining a constant stirring; at the beginning the temperature of the reacting mixture rised to approximately 40° C. Then the stirring was continued at room temperature during 2 hours, the mixture was acidified with diluted hydrochloric acid and the solvents eliminated by distillation in vacuo. The residue was chromatographed on neutral alumina (500 g.). Elution with benzene-ether (2:1 and 1:1) produced the acetate of 10α-(β-cyanoethyl)-5α-estran-17β-ol-2-one and further elution with benzene-ether (1:3) and ether alone gave the corresponding 10β-cyanoethyl steroid derivative.

The starting compounds listed under I were treated by the same procedures to give the corresponding 10α-substituted products under II, each one together with the respective 10β-isomer, which were separated by fractional crystallization or by conventional chromatography method:

| I | II |
|---|---|
| Δ¹⁽¹⁰⁾-5α-estren-17β-ol-2-one | 10α-(β-cyanoethyl)-5α-estran-17β-ol-2-one. |
| Propionate of Δ¹⁽¹⁰⁾-5α-estren-17β-ol-2-one. | Propionate of 10α-(β-cyanoethyl)-5α-estran-17β-ol-2-one. |
| Caproate of Δ¹⁽¹⁰⁾-5α-estren-17β-ol-2-one. | Caproate of 10α-(β-cyanoethyl)-5α-estran-17β-ol-2-one. |
| 17α-methyl-Δ¹⁽¹⁰⁾-5α-estren-17β-ol-2-one. | 17α-methyl-10α-(β-cyanoethyl)-5α-estran-17β-ol-2-one. |
| 17α-vinyl-Δ¹⁽¹⁰⁾-5α-estren-17β-ol-2-one. | 17α-vinyl-10α-(β-cyanoethyl)-5α-estran-17β-ol-2-one. |
| 17α-ethinyl-Δ¹⁽¹⁰⁾-5α-estren-17β-ol-2-one. | 17α-ethinyl-10α-(β-cyanoethyl)-5α-estran-17β-ol-2-one. |
| Acetate of 17α-methyl-Δ¹⁽¹⁰⁾-5α-estren-17β-ol-2-one. | Acetate of 17α-methyl-10α-(β-cyanoethyl)-5α-estran-17β-ol-2-one. |
| Propionate of 7α-vinyl-Δ¹⁽¹⁰⁾-5α-estren-17β-ol-2-one. | Propionate of 17α-vinyl-10α-(β-cyanoethyl)-5α-estran-17β-ol-2-one. |
| Caproate of 17α-ethinyl-Δ¹⁽¹⁰⁾-5α-estren-17β-ol-2-one. | Caproate of 17α-ethinyl-10α-(β-cyanoethyl)-5α-estran-17β-ol-2-one. |

*Example VII*

A solution of 1 g. of 10α-methyl-5α-estran-17β-ol-2-one in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.) until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 10α-methyl-5α-estrane-2,17-dione.

Following the same procedure there was treated the corresponding 10β-isomer of the starting material of this example to give the respective 2,17-diketo-10β-substituted estrane compound.

Example VIII

Upon applying the oxidation technique of Example VII to the 10α-substituted starting compounds listed hereinafter under I, there were obtained the corresponding products set forth under II:

| I | II |
| --- | --- |
| 10α-cyano-5α-estran-17β-ol-2-one | 10α-cyano-5α-estrane-2,17-dione. |
| 10α-dicarbethoxymethyl-5α-estran-17β-ol-2-one. | 10α-dicarbethoxymethyl-5α-estrane-2,17-dione. |
| 10α-ethinyl-5α-estran-17β-ol-2-one | 10α-ethinyl-5α-estrane-2,17-dione. |
| 10α-acetonyl-5α-estran-17β-ol-2-one | 10α-acetonyl-5α-estrane-2,17-dione. |
| 10α-(β-cyanoethyl)-5α-estran-17β-ol-2-one. | 10α-(β-cyanoethyl)-5α-estrane-2,17-dione. |

In the same manner the corresponding 10β-substituted isomers of the starting material listed under I were treated to produce the respective 10β-isomers of the diketo steroids set forth under II.

Example IX

In mixture of 1 g. of 10α-methyl-5α-estran-17β-ol-2-one (prepared according to Example I), 4 cc. of pyridine and 2 cc. of acetic anhydride, was maintained at room temperature overnight, poured into ice water, the formed precipitate was filtered, washed with water and dried.

Crystallization from acetone-hexane gave the acetate of 10α-methyl-5α-estran-17β-ol-2-one.

Following the same method, the corresponding 10β-isomer of the starting material set forth in this example was treated to produce the respective steroid acetate.

Example X

Upon applying the esterification technique of Example IX to the starting compound listed under I there were obtained the corresponding products set forth under II:

| I | II |
| --- | --- |
| 10α-cyano-5α-estran-17β-ol-2-one | 10α-cyano-5α-estran-17β-ol-2-one acetate. |
| 10α-dicarbethoxymethyl-5α-estran-17β-ol-2-one. | 10α-dicarbethoxymethyl-5α-estran-17β-ol-2-one acetate. |
| 10α-ethinyl-5α-estran-17β-ol-2-one | 10α-ethinyl-5α-estran-17β-ol-2-one acetate. |
| 10α-acetonyl-5α-estran-17β-ol-2-one | 10α-acetonyl-5α-estran-17β-ol-2-one acetate. |
| 10α-(β-cyanoethyl)-5α-estran-17β-ol-2-one. | 10α-(β-cyanoethyl)-5α-estran-17β-ol-2-one acetate. |

The corresponding 10β-substituted isomer of the starting materials listed before under I were treated in an identical manner, in order to obtain the 10β-isomeric acetates of the products set forth under II.

Example XI

There was thus followed esterification technique of Example IX, except that acetic anhydride was substituted by propionic anhydride, caproic anhydride and cyclopentylpropionic anhydride to give the corresponding propionate, caproate and cyclopentylpropionate of 10α-methyl-5α-estran-17β-ol-2-one and the respective esters of its 10β-substituted isomers.

Example XII

The esterification of the starting compounds set forth in Example X was carried out following the method of Example IX by substituting acetic anhydride by propionic anhydride, caproic anhydride and cyclopentylpropionic anhydride to give the corresponding propionates, caproates, and cyclopentylpropionates of the 10α-substituted products listed under I in Example X and of the respective 10β-isomeric derivatives.

Example XIII

To a solution of 5 g. of 10α,17α-dimethyl-5α-estran-17β-ol-2-one obtained in accordance with Example I in 100 cc. of anhydrous benzene, there were added 1 g. of p-toluenesulfonic acid and 10 cc. of an acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 10α,17α-dimethyl-5α-estran-17β-ol-2-one.

Following the same method, there was treated the 10β-isomer of the starting material set forth in this example to produce the respective steroid acetate.

Example XIV

Using the technique of Example XIII there were treated the starting compounds listed under I to produce the corresponding products set forth under II:

| I | II |
| --- | --- |
| 10α-methyl-17α-vinyl-5α-estran-17β-ol-2-one. | Acetate of 10α-methyl-17α-vinyl-5α-estran-17β-ol-2-one. |
| 10α-methyl-17α-ethinyl-5α-estran-17β-ol-2-one. | Acetate oof 10α-methyl-17α-ethinyl-5α-estran-17β-ol-2-one. |
| 17α-vinyl-10α-cyano-5α-estran-17β-ol-2-one. | Acetate of 17α-vinyl-10α-cyano-α-estran-17β-ol-2-one. |
| 17α-ethinyl-10α-cyano-5α-estran-17β-ol-2-one | Acetate of 17α-ethinyl-10α-cyano-5α-estran-17β-ol-2-one. |
| 17α-vinyl-10α-(dicarbethoxymethyl)-5α-estran-17β-ol-2-one. | Acetate of 17α-vinyl-10α-(dicarbethoxymethyl)-5α-estran-17β-ol-2-one. |
| 17α-ethinyl-10α(dicarbethoxymethyl)-5α-estran-17β-ol-2-one. | Acetate of 17α-ethinyl-10α-(dicarbethoxymethyl)-5α-estran-17β-ol-2-one. |
| 10α-ethinyl-17α-methyl-5α-estran-17β-ol-2-one. | Acetate of 10α-ethinyl-17α-methyl-5α-estran-17β-ol-2-one. |
| 10α-ethinyl-17α-vinyl-5α-estran-17β-ol-2-one. | Acetate of 10α-ethinyl-17α-vinyl-5α-estran-17β-ol-2-one. |
| 10α, 17α-diethinyl-5α-estran-17β-ol-2-one. | Acetate of 10α, 17α-diethinyl-5α-estran-17β-ol-2-one. |
| 17α-vinyl-10α-acetonyl-5α-estran-17β-ol-2-one. | Acetate of 17α-vinyl-10α-acetonyl-5α-estran-17β-ol-2-one. |
| 17α-ethinyl-10α-acetonyl-5α-estran-17β-ol-2-one. | Acetate of 17α-ethinyl-10α-acetonyl-5α-estran-17β-ol-2-one. |
| 17α-vinyl-10α-(β-cyanoethyl)-5α-estran-17β-ol-2-one. | Acetate of 17α-vinyl-10α-(β-cyanoethyl)-5α-estran-17β-ol-2-one. |
| 17α-ethinyl-10α-(β-cyanoethyl)-5α-estran-17β-ol-2-one. | Acetate of 17α-ethinyl-10α-(β-cyanoethyl)-5α-estran-17β-ol-2-one. |

The corresponding 10β-substituted isomer of the material described before under I were treated in a similar manner to produce the respective 10β-isomers of the compounds set forth under II.

Example XV

The esterification technique of Example XIII was repeated, except that acetic anhydride was substituted by propionic anhydride, caproic anhydride and cyclopentylpropionic anhydride to give respectively the propionate, caproate and cyclopentylpropionate of 10α,17α-dimethyl-5α-estran-17β-ol-2-one as well as the corresponding esters of the 10β-substituted isomer.

Example XVI

The starting compounds set forth in Example XIV were esterified following the technique described in Example XIII, with the exception that acetic anhydride substituted by propionic anhydride, caproic anhydride and cyclopentylpropionic anhydride to produce the corresponding propionates, caproates, and cyclopentylpropionates of the 10α-substituted compounds set forth under I in Example XIV of the corresponding 10β-substituted isomers.

I claim:
1. A compound of the following formula:

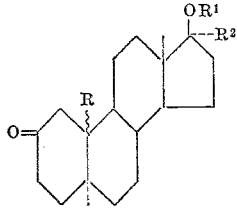

wherein R is selected from the group consisting of a cyano group, a dicarbethoxymethyl group, an acetonyl group, an ethinyl group and a β-cyanoethyl group; $R^1$ is a member of the group consisting of hydrogen and a hydrocarbon carboxylic acyl group of less than 12 carbon atoms; and $R^2$ is selected from the group consisting of hydrogen, lower alkyl, lower alkenyl and lower alkinyl.

2. 17α-methyl-10α-cyano-5α-estran-17β-ol-2-one.
3. 17α-vinyl-10α-cyano-5α-estran-17β-ol-2-one.
4. 17α-ethinyl-10α-cyano-5α-estran-17β-ol-2-one.
5. 17α - ethinyl - 10α - (dicarbethoxymethyl) - 5α-estran-17β-ol-2-one.
6. 10α,17α-diethinyl-5α-estran-17β-ol-2-one.
7. 17α-ethinyl-10α-acetonyl-5α-estran-17β-ol-2-one.
8. 17α-ethinyl-10α-(β-cyanoethyl)-5α-estran-17β-ol - 2-one.
9. 10-cyano-5α-estran-17β-ol-2-one.
10. 10-ethinyl-5α-estran-17β-ol-2-one.
11. 10-dicarbethoxymethyl-5α-estran-17β-ol-2-one.
12. 10-acetonyl-5α-estran-17β-ol-2-one.
13. 10-(β-cyanoethyl)-5α-estran-17β-ol-2-one.

14. A compound of the following formula:

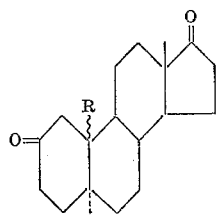

wherein R is selected from the group consisting of a cyano group, a dicarbethoxymethyl group, an acetonyl group, an ethinyl group and a β-cyanoethyl group.

15. A process for the production of a 10-cyanoestran-2-one which comprises treating the corresponding $\Delta^{1(10)}$-estren-2-one with an alkali metal cyanide in a polar organic solvent.

16. A process for the production of a 10-dicarbethoxymethyl-estran-2-one which comprises treating the corresponding $\Delta^{1(10)}$-estren-2-one with diethyl malonate in an inert solvent and in the presence of a basic catalyst.

17. A process for the production of an 10-ethinyl-estran-2-one which comprises treating the corresponding $\Delta^{1(10)}$-estren-2-one with an alkali metal acetylide in an inert solvent.

18. A process for the production of an 10-acetonyl-estran-2-one which comprises treating the corresponding $\Delta^{1(10)}$-estren-2-one with a dimethyl ketone in the presence of a basic catalyst.

19. A process for the production of a 10-(β-cyanoethyl)estran-2-one which comprises treating the corresponding $\Delta^{1(10)}$-estren-2-one with acrylonitrile in the presence of a basic catalyst in an inert solvent.

20. A process for the production of a 10-methyl-estran-2-one which comprises treating the corresponding $\Delta^{1(10)}$-estren-2-one with a methyl magnesium halide in the presence of cuprous chloride.

No references cited.